(12) United States Patent
Chiga

(10) Patent No.: US 10,090,561 B2
(45) Date of Patent: Oct. 2, 2018

(54) NONAQUEOUS ELECTROLYTE SECONDARY BATTERY

(71) Applicant: Panasonic Corporation, Osaka (JP)

(72) Inventor: Takanobu Chiga, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 195 days.

(21) Appl. No.: 14/885,958

(22) Filed: Oct. 16, 2015

(65) Prior Publication Data

US 2016/0043441 A1 Feb. 11, 2016

Related U.S. Application Data

(63) Continuation of application No. PCT/JP2014/002931, filed on Jun. 3, 2014.

(30) Foreign Application Priority Data

Jul. 8, 2013 (JP) .................................. 2013-142377

(51) Int. Cl.
*H01M 10/0569* (2010.01)
*H01M 2/16* (2006.01)
*H01M 4/13* (2010.01)
*H01M 10/052* (2010.01)
*H01M 10/058* (2010.01)
*H01M 10/0525* (2010.01)

(52) U.S. Cl.
CPC ..... *H01M 10/0569* (2013.01); *H01M 2/1646* (2013.01); *H01M 2/1653* (2013.01); *H01M 2/1673* (2013.01); *H01M 2/1686* (2013.01); *H01M 4/13* (2013.01); *H01M 10/052* (2013.01); *H01M 10/058* (2013.01); *H01M 10/0525* (2013.01); *H01M 2300/0028* (2013.01); *H01M 2300/0034* (2013.01); *H01M 2300/0037* (2013.01)

(58) Field of Classification Search
CPC .......... H01M 10/052; H01M 10/0525; H01M 10/0569; H01M 10/058; H01M 2300/0028; H01M 2300/0034; H01M 2300/0037; H01M 2/1646; H01M 2/1653; H01M 2/1673; H01M 2/1686; H01M 4/13

See application file for complete search history.

(56) References Cited

U.S. PATENT DOCUMENTS

| | | | |
|---|---|---|---|
| 2008/0206652 A1 | 8/2008 | Abe et al. | |
| 2010/0081062 A1* | 4/2010 | Chiga | H01M 10/0525 429/338 |
| 2010/0261069 A1* | 10/2010 | Nakura | H01M 2/1653 429/338 |

FOREIGN PATENT DOCUMENTS

| CN | 101252205 A | 8/2008 |
|---|---|---|
| CN | 101617432 A | 12/2009 |
| JP | 2001-273880 | 10/2001 |
| JP | 2008-210573 | 9/2008 |
| JP | 2009-289414 | 12/2009 |

OTHER PUBLICATIONS

International Search Report of PCT application No. PCT/JP2014/002931 dated Jul. 15, 2014.
English Translation of Chinese Search Report dated Oct. 9, 2016 for the related Chinese Patent Application No. 201480018044.5.

* cited by examiner

*Primary Examiner* — Sarah A. Slifka
*Assistant Examiner* — Victoria H Lynch
(74) *Attorney, Agent, or Firm* — McDermott Will & Emery LLP

(57) ABSTRACT

In a nonaqueous electrolyte secondary battery including a positive electrode containing a positive electrode active material, a negative electrode containing a negative electrode active material, a nonaqueous electrolyte containing a lithium salt in a nonaqueous solvent, and a separator disposed between the positive electrode and the negative electrode, an inorganic particle layer is disposed between the positive electrode and the separator, and the nonaqueous solvent contains a chain fluorinated carboxylate ester represented by the formula $CH_{3-x}F_x$—$CH_2$—COO—$CH_3$ (where, x is an integer of 1 to 3) in an amount of 15% by volume or more based on the total amount of the nonaqueous solvent.

4 Claims, No Drawings

NONAQUEOUS ELECTROLYTE SECONDARY BATTERY

BACKGROUND

1. Technical Field

The present disclosure relates to a nonaqueous electrolyte secondary battery.

2. Description of the Related Art

Recently, a demand for an increase in capacity of a nonaqueous electrolyte secondary battery has been increasing. The nonaqueous electrolyte secondary battery is generally produced by winding or laminating sheet-like positive electrode and negative electrode with a separator therebetween, of a fine porous film made of, for example, polyolefin to form an electrode assembly, putting the formed electrode assembly in an outer package, pouring a nonaqueous electrolyte into the outer package, and then sealing the package. Battery capacity can be increased through an increase in density of electrode materials, a reduction in thickness of, for example, the outer package or the separator, and an increase in charging voltage of the battery voltage. Among these methods, the increase in charging voltage is a useful technique because it can increase the capacity without changing the structure of the battery. However, an increase in charging voltage may cause dissolution or deterioration of the materials constituting the nonaqueous electrolyte secondary battery. Accordingly, it is difficult to increase the charging voltage to be higher than a predetermined value.

For example, in a lithium ion secondary battery including a positive electrode of lithium cobaltate, a negative electrode of a carbon material, and a separator of polyethylene as an embodiment of a nonaqueous electrolyte secondary battery, the charging voltage is set to 4.2 V or less. One reason of this is that a battery voltage of higher than 4.2 V at the completion of the charging oxidizes the separator made of polyethylene to degrade the separator and has a risk of generating a gas by the oxidization (Japanese Unexamined Patent Application Publication No. 2001-273880). Recently, positive electrode active materials that can be charged at a voltage higher than that in lithium cobaltate have been developed, and the use of such positive electrode active materials can increase the capacity. The capacity, however, cannot be increased due to the material of the separator. In order to solve this problem, Japanese Unexamined Patent Application Publication No. 2008-210573 proposes an inorganic oxide particle layer disposed on the surface of the separator facing the positive electrode.

SUMMARY

However, the technology disclosed in Japanese Unexamined Patent Application Publication No. 2008-210573 has a disadvantage of deteriorating the discharge rate characteristics by formation of the inorganic particle layer.

One non-limiting and exemplary embodiment provides a nonaqueous electrolyte secondary battery having excellent battery characteristics, in particular, excellent discharge rate characteristics and high-temperature charging storage characteristics.

In one general aspect, the techniques disclosed here feature a nonaqueous electrolyte secondary battery including a positive electrode containing a positive electrode active material, a negative electrode containing a negative electrode active material, a nonaqueous electrolyte of a nonaqueous solvent containing a lithium salt, and a separator disposed between the positive electrode and the negative electrode, wherein an inorganic particle layer is disposed between the positive electrode and the separator; and the nonaqueous solvent contains a chain fluorinated carboxylate ester represented by Formula (1) in an amount of 15% by volume or more based on the total amount of the nonaqueous solvent, $$CH_{3-x}F_x-CH_2-COO-CH_3 \qquad (1)$$

where, x is an integer of 1 to 3.

In the nonaqueous electrolyte secondary battery according to the present disclosure, the high-temperature charging storage characteristic can be improved without deteriorating the discharge rate characteristic.

Additional benefits and advantages of the disclosed embodiments will become apparent from the specification. The benefits and/or advantages may be individually obtained by the various embodiments and features of the specification, which need not all be provided in order to obtain one or more of such benefits and/or advantages.

DETAILED DESCRIPTION

Embodiments according to the present disclosure will now be described in detail. The nonaqueous electrolyte secondary battery according to an embodiment of the present disclosure has, for example, as described above, a structure including an electrode assembly and a nonaqueous electrolyte accommodated in an outer package, where the electrode assembly is formed by winding a positive electrode, a negative electrode, a separator between the positive electrode and the negative electrode, and an inorganic particle layer between the positive electrode and the separator. Each component of the nonaqueous electrolyte secondary battery will now be described in detail.

[Positive Electrode]

The positive electrode is composed of, for example, a positive electrode collector of, for example, metal foil and a positive electrode active material layer disposed on the positive electrode collector. The positive electrode collector can be, for example, metal foil that is stable in the potential range of the positive electrode or a film having a surface layer of a metal that is stable in the potential range of the positive electrode. The metal stable in the potential range of the positive electrode is preferably aluminum (Al). The positive electrode active material layer contains a conducting agent, a binding agent, and other components, in addition to the positive electrode active material and is prepared by mixing these materials with an appropriate solvent, applying the mixture onto the positive electrode collector, and then drying and rolling the resulting coating film.

The positive electrode active material can be, for example, a transition metal oxide containing lithium (Li) or a transition metal oxide in which a part of the transition metal element contained in the transition metal oxide is substituted by a different element. The transition metal element can be at least one element selected from the group consisting of scandium (Sc), manganese (Mn), iron (Fe), cobalt (Co), nickel (Ni), copper (Cu), and yttrium (Y). Among these transition metal elements, for example, Mn, Co, and Ni are particularly preferred. The different element can be at least one element selected from the group consisting of magnesium (Mg), aluminum (Al), lead (Pb), antimony (Sb), and boron (B). Among these elements, for example, Mg and Al are particularly preferred.

Examples of such a positive electrode active material include lithium-containing transition metal oxides, such as $LiCoO_2$, $LiNiO_2$, $LiMn_2O_4$, $LiMnO_2$, $LiNi_{1-y}Co_yO_2$ ($0<y<1$), and $LiNi_{1-y-z}Co_yMn_zO_2$ ($0<y+z<1$). These positive electrode active materials may be used alone or in a combination of two or more thereof.

In the nonaqueous electrolyte secondary battery according to the present disclosure, the potential of the positive electrode can be 4.35 V or more versus a metallic lithium reference. Accordingly, for example, a battery having a negative electrode of a graphite-based carbon material can be charged to a battery voltage of 4.25 V or more. The positive electrode active material is therefore preferably made of a material having a charge termination voltage of 4.25 V or more and more preferably a material having a charge termination voltage of 4.4 V or more. The upper limit of the charge termination voltage is not specifically limited and is preferably lower than a voltage that causes structural deterioration of the positive electrode active material or decomposes the nonaqueous solvent contained in the nonaqueous electrolyte.

The conducting agent has a function of enhancing the electronic conductivity of the positive electrode active material layer. The conducting agent may be any known conducting agent that is used for the positive electrode of a lithium ion secondary battery, and examples thereof include carbon materials, metal powders, and organic materials having conductivity. Specifically, examples of the carbon material include acetylene black, Ketjen black, and graphite; examples of the metal powder include aluminum; and examples of the organic material include phenylene derivatives. These conducting agents may be used alone or in a combination of two or more thereof.

The binding agent has a function of maintaining the good contact between the positive electrode active material and the conducting agent and of enhancing the binding property of, for example, the positive electrode active material to the surface of the positive electrode collector. The binding agent may be any known binding agent that is used for the positive electrode of a lithium ion secondary battery, and examples thereof include fluoropolymers and rubber polymers. Specifically, examples of the fluoropolymer include polytetrafluoroethylene (PTFE), polyvinylidene fluoride (PVdF), and modified products thereof; and examples of the rubber polymer include ethylene-propylene-isoprene copolymers and ethylene-propylene-butadiene copolymers. The binding agent may be used together with a thickener, such as carboxymethyl cellulose (CMC) or polyethylene oxide (PEO).

[Negative Electrode]

The negative electrode is composed of, for example, a negative electrode collector of, for example, metal foil and a negative electrode active material layer disposed on the negative electrode collector. The negative electrode collector can be, for example, metal foil that does not form any alloy with lithium within the potential range of the negative electrode or a film having a surface layer of a metal that does not form any alloy with lithium within the potential range of the negative electrode. The metal that does not form any alloy with lithium within the potential range of the negative electrode is preferably copper, because of its low cost, easiness in processing, and high electron conductivity. The negative electrode active material layer contains a negative electrode active material, a binding agent, and other components and is prepared by mixing these materials with water or an appropriate solvent, applying the mixture onto the negative electrode collector, and then drying and rolling the resulting coating film.

The negative electrode active material may be any material that can occlude and release lithium ions. Examples of such a negative electrode active material include carbon materials, metals, alloys, metal oxides, metal nitrides, and lithium ion-occluded carbon or silicon. Examples of the carbon materials include natural graphite, artificial graphite, and pitch-based carbon fibers. Examples of the metals and the alloys include lithium (Li), silicon (Si), tin (Sn), germanium (Ge), indium (In), gallium (Ga), lithium alloys, silicon alloys, and tin alloys. These materials as the negative electrode active material may be used alone or in a combination of two or more thereof.

The binding agent may be any known material that is used as the binding agent for the negative electrode of a lithium ion secondary battery. For example, a fluoropolymer or a rubber polymer can be used, as in the positive electrode, and a rubber polymer, such as a styrene-butadiene copolymer (SBR) or its modified product, can be preferably used. The binding agent may be used together with a thickener, such as sodium carboxymethyl cellulose (CMC).

The negative electrode collector is, for example, metal foil that does not form any alloy with lithium within the potential range of the negative electrode or a film having a surface layer of a metal that does not form any alloy with lithium within the potential range of the negative electrode. The metal that does not form any alloy with lithium within the potential range of the negative electrode is preferably copper, because of its low cost, easiness in processing, and high electron conductivity.

[Separator]

The separator is a porous film having ion permeability and insulation properties and is disposed between the positive electrode and the negative electrode. Examples of the porous film include microporous thin films, woven cloth, and nonwoven cloth. The material used as the separator is preferably polyolefin, more specifically, polyethylene or polypropylene.

[Inorganic Particle Layer]

The inorganic particle layer contains inorganic particles and a binder and is disposed between the positive electrode and the separator to prevent the positive electrode and the separator from being in direct contact with each other. The inorganic particle layer thus has a function of preventing the separator from being oxidized by the positive electrode charged to a high potential. As a result, for example, an effect of preventing occurrence of gas generation by oxidization of the separator is also conceivable, and the reliability of the battery may be improved. The inorganic particle layer "disposed between the positive electrode and the separator" may be formed on the surface of the positive electrode, on the surface of the separator, or on both the surfaces of the positive electrode and the separator.

The inorganic particle layer preferably has a thickness of 0.5 μm or more and 4 μm or less. The inorganic particle layer having a thickness not less than the lower limit is considered to sufficiently express certain effects. The effect of the inorganic particle layer is thought to be enhanced with an increase in the thickness, but an increase in the thickness is highly reflected on the load characteristic and the capacity to decrease them. The upper limit is therefore preferably 4 μm or less and more preferably 2 μm or less.

The inorganic particle layer can be formed by, for example, dispersing inorganic particles, a binder, and optionally a dispersant in a dispersion medium to prepare a slurry, applying the resulting slurry onto the surface of the positive electrode and/or the surface of the separator by a coating method, such as a gravure system, and then drying and removing the dispersion medium.

The inorganic particles forming the inorganic particle layer preferably have an insulation property and thermal stability and have low reactivity with lithium ions. Considering easiness and cost of manufacturing, in addition to the above-mentioned properties, the inorganic particles are preferably at least one selected from alumina (aluminum oxide, $Al_2O_3$), rutile titania (titanium oxide, $TiO_2$), and boehmite (aluminum hydroxide, AlOOH or $Al_2O_3 \cdot H_2O$). Alternatively, for example, silica, magnesia, zirconia, aluminum nitride, boron nitride, or silicon nitride may be used in some cases. The anatase titania allows insertion and deinsertion of lithium ions and occludes lithium ions depending on the environmental atmosphere and potential to express electron conductivity and is therefore undesirable from the viewpoint of a reduction in capacity of the battery and a risk of a short circuit.

The inorganic particles preferably have an average particle diameter of 1 µm or less and more preferably about 0.5 µm. An average particle diameter larger than the upper limit (1 µm) is undesirable because of a difficulty in control of the thickness of the inorganic particle layer within a range of 0.5 µm or more and 4 µm or less.

The binder has a function of bonding the inorganic particles to one another and bringing the inorganic particles into contact with the positive electrode or the separator. The material of the binder is not particularly limited and is preferably a material that comprehensively satisfies properties such as (A) securing of the dispersibility of the inorganic particles (prevention of reaggregation), (B) securing of the adhesion for undergoing the process of producing a battery, (C) filling of the gaps between the inorganic particles due to swelling after the absorption of the nonaqueous electrolyte, and (D) less elution into the nonaqueous electrolyte.

Such a binder can be an aqueous binder, i.e., an emulsion resin or a water-soluble resin, specifically, for example, polytetrafluoroethylene (PTFE), polyacrylonitrile (PAN), or styrene butadiene rubber (SBR); its modified product or derivative; a copolymer having an acrylonitrile structure (unit); or a polyacrylic acid derivative. In particular, in order to emphasize the properties (A) and (C) by a small amount of a binder, a copolymer having an acrylonitrile structure (unit) is preferred.

In order to secure battery characteristics, it is preferable to exhibit the above-mentioned effect with a small amount of a binder. Accordingly, the amount of the aqueous binder in the inorganic particle layer is preferably 30 parts by mass or less, more preferably 10 parts by mass or less, and most preferably 5 parts by mass or less, based on 100 parts by mass of the inorganic particles. The lower limit of the aqueous binder in the inorganic particle layer is generally 0.1 parts by mass or more.

Examples of the dispersion medium include water, NMP, acetone, and cyclopentanone. When the dispersion medium is water, for example, sodium carboxymethyl cellulose (CMC), which is a thickener and also has a function as a dispersant, can be used.

[Nonaqueous Electrolyte]

The nonaqueous electrolyte at least contains a nonaqueous solvent and an electrolyte salt soluble in the nonaqueous solvent. The present inventor has found that the problem of deteriorating the discharge rate characteristics by formation of an inorganic particle layer can be solved by using a nonaqueous solvent having high affinity to the inorganic particle layer. A nonaqueous solvent of an organic solvent containing fluorine is scarcely decomposed even at a high voltage, such as a charging voltage of higher than 4.4 V. The inventor has also found that the use of a nonaqueous solvent having both high affinity and resistance to high voltage can solve the above-mentioned problem. That is, the nonaqueous solvent is preferably an organic solvent having high affinity to the inorganic particle layer and containing fluorine (i.e., at least one hydrogen atom is substituted by a fluorine atom). From the above-mentioned viewpoint, the nonaqueous solvent is preferably a chain fluorinated carboxylate ester represented by Formula (1):

$$CH_{3-X}F_X-CH_2-COO-CH_3 \quad (1)$$

where, x is an integer of 1 to 3.

In the chain fluorinated carboxylate ester represented by Formula (1), at least one hydrogen atom of the methyl group represented by the formula $CH_{3-X}$ is substituted by fluorine, and preferably, a larger number of hydrogen atoms in the methyl group are substituted by fluorine. Accordingly, a larger value of x within the above-mentioned range is preferred. In particular, x=3, i.e., methyl 3,3,3-trifluoropropionate (hereinafter, may also be referred to as FMP), which is represented by the chemical formula $CF_3CH_2COOCH_3$, is preferred.

The content of the chain fluorinated carboxylate ester represented by Formula (1) is preferably 15% by volume or more, more preferably 20% by volume or more, based on the total amount of the nonaqueous solvent. When the content is higher than the lower limit, the recovery capacity, described below, of the battery preserved at high temperature is improved. The upper limit of the content is not particularly limited and is preferably 85% by volume or less, more preferably 80% by volume or less, based on the total amount of the nonaqueous solvent.

The inventor has already found that the chain fluorinated carboxylate ester represented by Formula (1) reacts with the negative electrode at about 1.2 V or less versus a metallic lithium reference and is reductively decomposed (Japanese Unexamined Patent Application Publication No. 2009-289414). Accordingly, in order to prevent the reductive decomposition, the nonaqueous solvent preferably contains a film-forming compound that forms a film on the surface of the negative electrode. The above-mentioned upper limit is determined by considering the case in which this film-forming compound functions as a nonaqueous solvent.

The film-forming compound can be at least one selected from, for example, 4-fluoroethylene carbonate (hereinafter, may be simply referred to as FEC) and its derivatives, ethylene sulfite and its derivatives, vinyl ethylene carbonate and its derivatives, $LiB(C_2O_4)_2$, and $LiBF_2(C_2O_4)$. In particular, 4-fluoroethylene carbonate is preferred because it forms an appropriate film on the negative electrode and effectively functions as a nonaqueous solvent. Here, the potential at which reductive decomposition occurs is about 1.2 V in 4-fluoroethylene carbonate, about 1.1 V in ethylene sulfite, about 1.3 V in vinyl ethylene carbonate, about 2.0 V in $LiB(C_2O_4)_2$, and about 1.7 V in $LiBF_2(C_2O_4)$, versus a metallic lithium reference.

The above-mentioned potentials are values each obtained by dissolving $LiPF_6$ in the chain fluorinated carboxylate ester represented by Formula (1) at an amount of 1 mol/L, using the negative electrode of a graphite-based carbon material as the working electrode, and performing CV measurement at a scanning rate of 1 mV/sec. Since the potential of the negative electrode of a graphite-based carbon material when a nonaqueous electrolyte is poured is about +3.0 V versus a metallic lithium reference, the nonaqueous solvent preferably contains a film-forming compound that is decomposed at a potential of +3.0 V or less. Therefore, the film-forming compound is preferably reductively decomposed within a potential range of +1.0 to +3.0 V, more preferably +1.1 to +2.0 V, versus a metallic lithium reference.

In the nonaqueous solvent containing 4-fluoroethylene carbonate as the film-forming compound, if the amount of 4-fluoroethylene carbonate is small, a sufficient film is not formed on the negative electrode to cause reductive decomposition of the chain fluorinated carboxylate ester. Accordingly, when the nonaqueous electrolyte secondary battery in a charged state is left to stand at high temperature, the reservation characteristics may be reduced. In contrast, an excess amount of 4-fluoroethylene carbonate may reduce the load characteristic by an increase in the viscosity of the nonaqueous electrolyte. Accordingly, the amount of 4-fluoroethylene carbonate is preferably within a range of 2% by volume or more and 40% by volume or less, more preferably 5% by volume or more and 30% by volume or less, based on the total amount of the nonaqueous solvent.

When the film-forming compound contained in the nonaqueous solvent is ethylene sulfite or its derivative or vinyl ethylene carbonate or its derivative, the content thereof is preferably 0.1% by weight or more and 10% by weight or less, more preferably 0.2% by weight or more and 5% by weight or less, based on the total amount of the nonaqueous electrolyte. When the film-forming compound contained in the nonaqueous solvent is $LiB(C_2O_4)_2$ or $LiBF_2(C_2O_4)$, the content thereof is preferably 0.01 mol/L or more and 0.4 mol/L or less, more preferably 0.05 mol/L or more and 0.2 mol/L or less, based on the amount of the nonaqueous solvent. If the amounts of these film-forming compounds are lower than the above-mentioned lower limits, sufficient films cannot be formed on the negative electrodes, and satisfactory high-temperature charging storage characteristics may not be obtained due to reductive decomposition of the respective chain fluorinated carboxylate esters, whereas amounts higher than the upper limits cause significant decomposition of these film-forming compounds, which may cause an increase in internal resistance or generation of gas.

The nonaqueous solvent may further contain another fluorine-free nonaqueous solvent, in addition to the chain fluorinated carboxylate ester and the film-forming compound. The fluorine-free nonaqueous solvent is preferably ethyl methyl carbonate (hereinafter, may be also referred to as EMC). Other examples of the fluorine-free nonaqueous solvent include dimethyl carbonate, diethyl carbonate, methyl acetate, methyl propionate, and ethyl acetate. The proportion of the fluorine-based nonaqueous solvent to the total amount of the nonaqueous solvent can be, for example, 70% by volume or more, 75% by volume or more, 80% by volume or more, 85% by volume or more, 90% by volume or more, or 95% by volume or more. The term "fluorine-based nonaqueous solvent" refers to a nonaqueous solvent containing fluorine.

As the electrolyte salt, $LiB(C_2O_4)_2$ or $LiBF_2(C_2O_4)$, which is used as the film-forming compound, can also be used. In addition, lithium salts, which are generally used as supporting electrolytes in known nonaqueous electrolyte secondary batteries, can also be used. Preferred examples of the lithium salts include $LiPF_6$, $LiBF_4$, $LiCF_3SO_3$, $LiClO_4$, $LiN(CF_3SO_2)_2$, $LiN(C_2F_5SO_2)_2$, $LiN(CF_3SO_2)(C_4F_9SO_2)$, $LiC(CF_3SO_2)_3$, and $LiC(C_2F_5SO_2)_3$. In particular, $LiPF_6$, $LiBF_4$, and $LiN(CF_3SO_2)_2$ are preferred.

The nonaqueous electrolyte can optionally contain an additive. The additive forms an ion permeable film on the surface of the positive electrode or negative electrode before the decomposition reaction of the nonaqueous electrolyte on the surface of the positive electrode or negative electrode and thereby functions as a surface film-forming agent that prevents the decomposition reaction of the nonaqueous electrolyte on the surface of the positive electrode or negative electrode. The surface of the positive electrode or negative electrode is the interface between the nonaqueous electrolyte involved in the reaction and the positive electrode active material or negative electrode active material, i.e., refers to the surface of the positive electrode active material layer or negative electrode active material layer and the surface of the positive electrode active material or negative electrode active material.

Regarding the additive, for example, ethylene sulfite (ES) and lithium bis(oxalato)borate (LiBOB), which are used as the film-forming compounds, can be used, and, for example, cyclohexylbenzene (CHB), ortho-terphenyl (OTP), and vinylene carbonate (VC), which have an effect different from that of the film-forming compounds, can also be used. The additives may be used alone or in a combination of two or more thereof. The nonaqueous electrolyte may contain any amount of the additive(s) sufficient for forming a coating film, and the amount is preferably higher than 0% by mass and not higher than 2% by mass based on the total amount of the nonaqueous electrolyte.

EXAMPLES

The present disclosure will now be more specifically described with reference to examples and comparative examples, but is not limited to the following examples. Nonaqueous electrolyte secondary batteries to be used in Examples 1 to 7 and Comparative Examples 1 to 12 were produced. A specific process of producing a nonaqueous electrolyte secondary battery is as follows.

Example 1

[Production of Positive Electrode]

The positive electrode active material used was a mixture of $LiCoO_2$ (lithium cobaltate) and a lithium-containing transition metal oxide represented by the compositional formula $LiNi_{0.33}Co_{0.33}Mn_{0.33}O_2$ at a mass ratio of 9:1. The positive electrode was produced as follows. A positive electrode active material (95% by mass), acetylene black (2.5% by mass) serving as a conducting agent, and a poly(vinylidene fluoride) powder (2.5% by mass) serving as a binding agent were mixed with an N-methyl-2-pyrrolidone (NMP) solution to prepare a slurry. This slurry was applied onto both surfaces of an aluminum positive electrode collector to form positive electrode active material layers. After drying, compression was performed to produce a positive electrode having a packing density of 3.80 g/cm$^3$.

[Production of Inorganic Particle Layer]

A slurry was prepared using alumina ($Al_2O_3$, average particle diameter: 500 nm, manufactured by Sumitomo Chemical Company, trade name: "AKP3000", high purity alumina) serving as inorganic particles, a copolymer (rubber polymer) having an acrylonitrile structure (unit) serving as an aqueous binder, sodium carboxymethyl cellulose (CMC) serving as a dispersant, and water serving as a dispersion medium. The amount of the aqueous binder was 3 parts by mass based on 100 parts by mass of the inorganic particles. The amount of the dispersant was 0.5 parts by mass based on 100 parts by mass of the inorganic particles. The disperser used was Filmix manufactured by Primix Corporation. The prepared slurry was applied onto both surfaces of the positive electrode with a gravure system. The water serving as the dispersion medium was dried and removed to form inorganic particle layers on both surfaces of the positive electrode. The inorganic particle layers each had a thickness of 1.5 μm.

[Production of Negative Electrode]

The negative electrode was produced as follows. Graphite (98% by mass) serving as a negative electrode active material, a styrene-butadiene copolymer (SBR) (1% by mass) serving as a binding agent, and sodium carboxymethyl cellulose (1% by mass) serving as a thickener were mixed with water to prepare a slurry. This slurry was applied onto both surfaces of a copper negative electrode collector to form negative electrode active material layers. After drying, compression was performed to produce a negative electrode having a packing density of 1.60 g/cm$^3$.

[Production of Nonaqueous Electrolyte]

4-Fluoroethylene carbonate (FEC) having a function as a film-forming compound and methyl 3,3,3-trifluoropropionate (FMP) represented by the chemical formula $CF_3CH_2COOCH_3$ were mixed at a volume ratio of 2:8 to prepare a nonaqueous solvent. $LiPF_6$ serving as an electrolyte salt was dissolved in the nonaqueous solvent at a concentration of 1.0 mol/L to prepare a liquid nonaqueous electrolyte, i.e., an electrolytic solution.

[Production of Battery]

Lead terminals were attached to the positive electrode and the negative electrode produced above. Subsequently, the positive electrode and the negative electrode were disposed so as to face each other with a separator having a thickness of 23 μm therebetween and were spirally wound. The resulting roll was pressed and crushed to prepare a flat electrode assembly. The electrode assembly and the electrolytic solution were put in an outer package of aluminum laminate, and the outer package was then sealed to produce battery A having a designed capacity of 800 mAh. The designed capacity of battery A was designed using the charge termination voltage when the battery voltage of battery A was charged until 4.4 V as a reference. Battery A had a size of 3.6 mm×35 mm×62 mm. The produced battery A was stabilized by performing charge and discharge, i.e., battery A was charged at a constant current of 0.5 It (400 mA) until a voltage of 4.4 V then at a constant voltage of 4.4 V until a current of 40 mA, and was left to stand for 10 min. Subsequently, battery A was discharged at a constant current of 0.5 It (400 mA) until a voltage of 2.75 V.

[Evaluation of Discharge Rate Characteristic]

After the stabilization, battery A was evaluated for the rate characteristic. Battery A was charged at a constant current of 0.5 It (400 mA) until a voltage of 4.4 V then at a constant voltage of 4.4 V until a current of 40 mA, and was left to stand for 10 minutes. The battery was then discharged at a constant current of 1 It (800 mA) until a voltage of 2.75 V, and the discharge capacity Q1 at 1 It was measured. Subsequently, battery A was charged at a constant voltage of 4.4 V until a current of 40 mA, was then left to stand for 10 minutes, and was discharged at a constant current of 2 It (1600 mA) until a voltage of 2.75 V. The discharge capacity Q2 at 2 It was then measured. The discharge rate characteristic was evaluated by calculating the discharge capacity retention rate (%) by the following expression:

Discharge capacity retention rate (%)=$Q2/Q1 \times 100$.

[Evaluation of 60° C. Charge Preservation Characteristic]

In order to comprehend the high-temperature durability at 60° C., the 60° C. charge preservation characteristic was evaluated. Battery A was charged at a constant current of 1 It (800 mA) until a voltage of 4.4 V then at a constant voltage of 4.4 V until a current of 40 mA, and was left to stand for 10 minutes. Battery A was then discharged at a constant current of 0.2 It (160 mA) until a voltage of 2.75 V, and the discharge capacity Qbefore was then measured. Subsequently, battery A was charged at a constant voltage of 4.4 V in a thermostat chamber of 60° C. for 65 hours and was then cooled to room temperature and discharged at a constant current of 0.2 It (160 mA) until a voltage of 2.75 V at room temperature. Battery A was then charged at a constant voltage of 4.4 V until a current of 40 mA and was then left to stand for 10 minutes. Battery A was then discharged at a constant current of 0.2 It (160 mA) until a voltage of 2.75 V, and the discharge capacity Qafter was then measured. The 60° C. charge preservation characteristic was evaluated by calculating the capacity recovery rate (%) by the following expression:

Capacity recovery rate (%)=$Q$after/$Q$before$\times 100$.

[Evaluation of 80° C. Charge Preservation Characteristic]

In addition, in order to comprehend the high-temperature durability at 80° C., the 80° C. charge preservation characteristic was evaluated. Battery A was charged at a constant current of 1 It (800 mA) until a voltage of 4.4 V then at a constant voltage of 4.4 V until a current of 40 mA, and was left to stand for 10 minutes. Battery A was then discharged at a constant current of 0.2 It (160 mA) until a voltage of 2.75 V, and the discharge capacity Qbefore was then measured. Subsequently, battery A was charged at a constant current of 1 It (800 mA) until a voltage of 4.4 V then at a constant voltage of 4.4 V until a current of 40 mA and was then preserved in a thermostat chamber of 80° C. for 44 hours. Battery A was then cooled to room temperature and was then discharged at a constant current of 0.2 It (160 mA) until a voltage of 2.75 V at room temperature. Subsequently, battery A was charged at a constant voltage of 4.4 V until a current of 40 mA and was then left to stand for 10 minutes. Battery A was then discharged at a constant current of 0.2 It (160 mA) until a voltage of 2.75 V, and the discharge capacity Qafter was then measured. The 80° C. charge preservation characteristic was evaluated by calculating the capacity recovery rate (%) by the following expression:

Capacity recovery rate (%)=$Q$after/$Q$before$\times 100$.

Comparative Example 1

Battery A was produced as in Example 1 except that the inorganic particle layer was not formed in the positive electrode and was evaluated for the discharge rate characteristic and 60° C. and 80° C. charge preservation characteristics.

Comparative Example 2

Battery A was produced as in Example 1 except that EMC was used instead of FMP as the nonaqueous solvent and was evaluated for the discharge rate characteristic and 60° C. and 80° C. charge preservation characteristics.

Comparative Example 3

Battery A was produced as in Comparative Example 2 except that the inorganic particle layer was not formed in the positive electrode and was evaluated for the discharge rate characteristic and 60° C. and 80° C. charge preservation characteristics.

Comparative Example 4

Battery A was produced as in Example 1 except that methyl 2,2,2-trifluoroethyl carbonate ($CF_3CH_2OCOOCH_3$) was used instead of FMP as the nonaqueous solvent and was evaluated for the discharge rate characteristic and 60° C. and 80° C. charge preservation characteristics.

Comparative Example 5

Battery A was produced as in Comparative Example 4 except that the inorganic particle layer was not formed in the positive electrode and was evaluated for the discharge rate characteristic and 60° C. and 80° C. charge preservation characteristics.

Comparative Example 6

Battery A was produced as in Example 1 except that 2,2,2-trifluoroethyl acetate ($CH_3COOCH_2CF_3$) was used instead of FMP as the nonaqueous solvent and was evaluated for the discharge rate characteristic and 60° C. and 80° C. charge preservation characteristics.

Comparative Example 7

Battery A was produced as in Comparative Example 6 except that the inorganic particle layer was not formed in the positive electrode and was evaluated for the discharge rate characteristic and 60° C. and 80° C. charge preservation characteristics.

Table 1 summarizes the discharge capacity retention rates as the discharge rate characteristics of the batteries in Example 1 and Comparative Examples 1 to 7.

TABLE 1

| | Nonaqueous solvent | Inorganic particle layer | 2 C/1 C Capacity retention rate (%) | Variation in capacity retention rate by disposition of inorganic particle layer |
|---|---|---|---|---|
| Example 1 | FEC/$CF_3CH_2COOCH_3$ | Positive electrode ($Al_2O_3$) | 94 | 0 |
| Comparative Example 1 | | None | 94 | |
| Comparative Example 2 | FEC/$CH_3CH_2OCOOCH_3$ | Positive electrode ($Al_2O_3$) | 94 | −2 |
| Comparative Example 3 | | None | 96 | |
| Comparative Example 4 | FEC/$CF_3CH_2OCOOCH_3$ | Positive electrode ($Al_2O_3$) | 56 | −4 |
| Comparative Example 5 | | None | 60 | |
| Comparative Example 6 | FEC/$CH_3COOCH_2CF_3$ | Positive electrode ($Al_2O_3$) | 91 | −3 |
| Comparative Example 7 | | None | 94 | |

It is presumed that formation of an inorganic particle layer on the surface of the positive electrode generally reduces the discharge rate characteristic because of an increase in the distance between the positive electrode and the negative electrode. Contrary to expectation, Table 1 demonstrates that the use of the electrolytic solution of Example 1 did not cause a specific reduction in the discharge rate characteristics even if the inorganic particle layer was formed. Although the details of this cause are unclear at the moment, it is presumed that since the high affinity between the inorganic particle layer and $CF_3CH_2COOCH_3$ enhances the permeability of the electrolytic solution into the surface of the positive electrode through the inorganic layer, even if the distance between the electrodes is increased, the discharge rate characteristics are rarely decreased. However, such an effect was not obtained in Comparative Examples 4 and 6 using nonaqueous solvents containing fluorine as in Example 1, which demonstrates that the effect is specific to the nonaqueous solvent, $CF_3CH_2COOCH_3$, of the present disclosure.

Table 2 summarizes the capacity recovery rates as 60° C. charge preservation characteristics of the batteries in Example 1 and Comparative Examples 1 to 7.

TABLE 2

| | Nonaqueous solvent | Inorganic particle layer | 60° C. charge preservation capacity recovery rate (%) | Variation in capacity retention rate by disposition of inorganic particle layer |
|---|---|---|---|---|
| Example 1 | FEC/$CF_3CH_2COOCH_3$ | Positive electrode ($Al_2O_3$) | 91 | +2 |
| Comparative Example 1 | | None | 89 | |
| Comparative Example 2 | FEC/$CH_3CH_2OCOOCH_3$ | Positive electrode ($Al_2O_3$) | 83 | +5 |
| Comparative Example 3 | | None | 78 | |
| Comparative Example 4 | FEC/$CF_3CH_2OCOOCH_3$ | Positive electrode ($Al_2O_3$) | 91 | +2 |
| Comparative Example 5 | | None | 89 | |
| Comparative Example 6 | FEC/$CH_3COOCH_2CF_3$ | Positive electrode ($Al_2O_3$) | 88 | +1 |
| Comparative Example 7 | | None | 87 | |

As shown in Table 2, the results of the preservation test at 60° C. demonstrate that the formation of the inorganic particle layer increased the capacity recovery rate in all electrolytic solutions. This is presumed to be caused by that the physical contact between the separator and the positive electrode is prevented by the formation of the inorganic particle layer to suppress oxidation of the separator.

Table 3 summarizes the capacity recovery rates as 80° C. charge preservation characteristics of the batteries in Example 1 and Comparative Examples 1 to 7.

TABLE 3

|  | Nonaqueous solvent | Inorganic particle layer | 80° C. charge preservation capacity recovery rate (%) | Variation in capacity retention rate by disposition of inorganic particle layer |
|---|---|---|---|---|
| Example 1 | FEC/CF$_3$CH$_2$COOCH$_3$ | Positive electrode (Al$_2$O$_3$) | 83 | +3 |
| Comparative Example 1 |  | None | 80 |  |
| Comparative Example 2 | FEC/CH$_3$CH$_2$OCOOCH$_3$ | Positive electrode (Al$_2$O$_3$) | 68 | −1 |
| Comparative Example 3 |  | None | 69 |  |
| Comparative Example 4 | FEC/CF$_3$CH$_2$OCOOCH$_3$ | Positive electrode (Al$_2$O$_3$) | 71 | −3 |
| Comparative Example 5 |  | None | 74 |  |
| Comparative Example 6 | FEC/CH$_3$COOCH$_2$CF$_3$ | Positive electrode (Al$_2$O$_3$) | 75 | −3 |
| Comparative Example 7 |  | None | 78 |  |

Table 3 demonstrates that in the preservation at 80° C., the capacity recovery rate is decreased by the formation of the inorganic particle layer, excluding the electrolytic solution of Example 1. Although the details of this cause are unclear at the moment, it is presumed that the preservation at 80° C. accelerates oxidative decomposition of the electrolytic solution to generate a large amount of oxidative decomposition product compared to the case of 60° C. and that the decomposition product is deposited inside the inorganic particle layer to inhibit the permeability of the electrolytic solution into the inorganic particle layer. In contrast, it is presumed that in Example 1, as also demonstrated by the results of evaluation of the discharge rate characteristics, the high affinity between CF$_3$CH$_2$COOCH$_3$ and the inorganic particle layer secures the permeability of the electrolytic solution, even if the decomposition product of the electrolytic solution is deposited inside the inorganic particle layer, to increase the recovery capacity.

In order to verify the effects on the discharge rate characteristics and 80° C. charge preservation characteristics when the electrolytic solution composition or the inorganic particles forming the inorganic particle layer are changed, the batteries of Examples 2 to 7 and Comparative Examples 8 to 12 were subjected to determination of the capacity retention rate as a discharge rate characteristic and the capacity recovery rate as an 80° C. charge preservation characteristic.

Example 2

Battery A was produced as in Example 1 except that rutile titania was used instead of alumina as the inorganic particles and was evaluated for the discharge rate characteristic and 80° C. charge preservation characteristic.

Example 3

Battery A was produced as in Example 1 except that the inorganic particle layer was formed on the surface of the separator facing the positive electrode instead of the surface of the positive electrode and was evaluated for the discharge rate characteristic and 80° C. charge preservation characteristic.

Example 4

Battery A was produced as in Example 3 except that rutile titania was used instead of alumina as the inorganic particles and was evaluated for the discharge rate characteristic and 80° C. charge preservation characteristic.

Example 5

Battery A was produced as in Example 1 except that the nonaqueous solvent composition was changed to FEC/FMP=3/7 from FEC/FMP=2/8 and was evaluated for the discharge rate characteristic and 80° C. charge preservation characteristic.

Comparative Example 8

Battery A was produced as in Example 5 except that the inorganic particle layer was not formed in the positive electrode and was evaluated for the discharge rate characteristic and 80° C. charge preservation characteristic.

Example 6

Battery A was produced as in Example 1 except that the nonaqueous solvent composition was changed to FEC/FMP/EMC=2/4/4 from FEC/FMP=2/8 and was evaluated for the discharge rate characteristic and 80° C. charge preservation characteristic.

Comparative Example 9

Battery A was produced as in Example 6 except that the inorganic particle layer was not formed in the positive electrode and was evaluated for the discharge rate characteristic and 80° C. charge preservation characteristic.

Example 7

Battery A was produced as in Example 1 except that the nonaqueous solvent composition was changed to FEC/FMP/

EMC=2/2/6 from FEC/FMP=2/8 and was evaluated for the discharge rate characteristic and 80° C. charge preservation characteristic.

Comparative Example 10

Battery A was produced as in Example 7 except that the inorganic particle layer was not formed in the positive electrode and was evaluated for the discharge rate characteristic and 80° C. charge preservation characteristic.

Comparative Example 11

Battery A was produced as in Example 1 except that the nonaqueous solvent composition was changed to FEC/FMP/EMC=2/1/7 from FEC/FMP=2/8 and was evaluated for the discharge rate characteristic and 80° C. charge preservation characteristic.

Comparative Example 12

Battery A was produced as in Comparative Example 11 except that the inorganic particle layer was not formed in the positive electrode and was evaluated for the discharge rate characteristic and 80° C. charge preservation characteristic.

Table 4 summarizes the capacity retention rates as discharge rate characteristics and the capacity recovery rates as 80° C. charge preservation characteristics of the batteries in Examples 1 to 7 and Comparative Examples 1 and 8 to 12.

electrode as long as the inorganic particle layer is disposed between the positive electrode and the separator.

A comparison of the results of Examples 5 to 7 and the results of Comparative Examples 8 to 10 demonstrates that the 80° C. charge preservation characteristics are improved by forming the inorganic particle layer. The results of Example 1 and Examples 5 to 7 demonstrate that the effect can be obtained when the content of $CF_3CH_2COOCH_3$ is 20% by volume or more based on the total amount of the nonaqueous solvent. In contrast, the results of Comparative Examples 11 and 12 demonstrate that even if the battery has an inorganic particle layer, the effect on the 80° C. charge preservation characteristics cannot be obtained when the content of $CF_3CH_2COOCH_3$ is 10% by volume based on the total amount of the nonaqueous solvent. These results suggest that the content of $CF_3CH_2COOCH_3$ is preferably 15% by volume or more based on the total amount of the nonaqueous solvent.

As described above, a nonaqueous electrolyte secondary battery including an inorganic particle layer between the positive electrode and the separator and including a nonaqueous solvent containing 15% by volume or more of a chain fluorinated carboxylate ester ($CH_{3-x}F_xCH_2COOCH_3$) based on the total amount of the nonaqueous solvent has excellent discharge rate characteristic and high-temperature charging storage characteristic.

The present disclosure is useful as nonaqueous electrolyte secondary batteries for, for example, cars or mobile terminals.

TABLE 4

|  | Nonaqueous solvent | Inorganic particle layer | 2 C/1 C Capacity retention rate (%) | 80° C. charge preservation capacity recovery rate (%) |
| --- | --- | --- | --- | --- |
| Example 1 | FEC/$CF_3CH_2COOCH_3$ = 2/8 | Positive electrode ($Al_2O_3$) | 94 | 83 |
| Example 2 |  | Positive electrode ($TiO_2$) | 94 | 84 |
| Example 3 |  | Separator ($Al_2O_3$) | 94 | 83 |
| Example 4 |  | Separator ($TiO_2$) | 94 | 83 |
| Comparative Example 1 |  | None | 94 | 80 |
| Example 5 | FEC/$CF_3CH_2COOCH_3$ = 3/7 | Positive electrode ($Al_2O_3$) | 93 | 83 |
| Comparative Example 8 |  | None | 93 | 79 |
| Example 6 | FEC/$CF_3CH_2COOCH_3$/$CH_3CH_2OCOOCH_3$ = 2/4/4 | Positive electrode ($Al_2O_3$) | 95 | 82 |
| Comparative Example 9 |  | None | 95 | 78 |
| Example 7 | FEC/$CF_3CH_2COOCH_3$/$CH_3CH_2OCOOCH_3$ = 2/2/6 | Positive electrode ($Al_2O_3$) | 95 | 81 |
| Comparative Example 10 |  | None | 95 | 77 |
| Comparative Example 11 | FEC/$CF_3CH_2COOCH_3$/$CH_3CH_2OCOOCH_3$ = 2/1/7 | Positive electrode ($Al_2O_3$) | 94 | 73 |
| Comparative Example 12 |  | None | 96 | 74 |

As shown in Table 4, for example, the results of Example 2 demonstrate that the effect as in Example 1 can be obtained even if rutile titania was used as inorganic particles forming the inorganic particle layer. The results of Examples 3 and 4 in which the inorganic particle layer was formed on the surface of the separator were substantially the same as that in Example 1. This demonstrates that the inorganic particle layer may be formed on either the surface of the positive electrode or the surface of the separator facing the positive

What is claimed is:

1. A nonaqueous electrolyte secondary battery comprising:

a positive electrode containing a positive electrode active material;

a negative electrode containing a negative electrode active material;

a nonaqueous electrolyte of a nonaqueous solvent mainly composed of a fluorine-based solvent and containing a lithium salt; and a separator disposed between the positive electrode and the negative electrode, wherein an inorganic particle layer is disposed between the positive electrode and the separator and arranged to prevent the positive electrode and the separator from being in direct contact with each other, the nonaqueous solvent contains a chain fluorinated carboxylate ester represented by Formula (1) in an amount of 15% by volume or more based on the total amount of the nonaqueous solvent, $$CH_{3-x}F_x-CH_2-COO-CH_3 \qquad (1)$$

where, x is an integer of 1 to 3, the nonaqueous solvent further contains 4-fluoroethylene carbonate (FEC), and the chain fluorinated carboxylate ester includes methyl 3,3,3-trifluoropropionate (FMP) represented by a chemical formula: $CF_3CH_2COOCH_3$.

2. The nonaqueous electrolyte secondary battery according to claim 1, wherein a content of the chain fluorinated carboxylate ester is 15% by volume or more and 85% by volume or less based on the total amount of the nonaqueous solvent.

3. The nonaqueous electrolyte secondary battery according to claim 1, wherein the inorganic particle layer contains at least one of alumina, rutile titania, and boehmite.

4. The nonaqueous electrolyte secondary battery according to claim 1, wherein the inorganic particle layer is formed on the surface of the positive electrode.

* * * * *